United States Patent
Matsuura (10) Patent No.: US 11,104,163 B2
(45) Date of Patent: Aug. 31, 2021

(54) PRINTING APPARATUS

(71) Applicant: Brother Kogyo Kabushiki Kaisha, Nagoya (JP)

(72) Inventor: Kazunari Matsuura, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/686,884

(22) Filed: Nov. 18, 2019

(65) Prior Publication Data
US 2020/0207130 A1 Jul. 2, 2020

(30) Foreign Application Priority Data

Dec. 28, 2018 (JP) .............................. JP2018-247783

(51) Int. Cl.
*B41J 25/316* (2006.01)
*B41J 3/407* (2006.01)

(52) U.S. Cl.
CPC .................................. *B41J 25/316* (2013.01)

(58) Field of Classification Search
CPC ........ B41J 3/4073; B41J 25/316; B41J 25/34; B41M 1/40
See application file for complete search history.

(56) References Cited

U.S. PATENT DOCUMENTS

| 2009/0073200 | A1 | 3/2009 | Tezuka et al. | |
| 2014/0063096 | A1* | 3/2014 | Pitz | B41J 11/002 347/9 |
| 2015/0070423 | A1* | 3/2015 | Norigoe | B41J 2/04573 347/10 |
| 2015/0138275 | A1* | 5/2015 | Noell | B25J 11/0075 347/37 |
| 2016/0052312 | A1* | 2/2016 | Pitz | B41J 25/003 347/37 |

FOREIGN PATENT DOCUMENTS

| JP | 2008-221494 A | 9/2008 |
| JP | 2011-177931 A | 9/2011 |

* cited by examiner

*Primary Examiner* — Jason S Uhlenhake
(74) *Attorney, Agent, or Firm* — Banner & Witcoff, Ltd.

(57) ABSTRACT

A printing apparatus includes: a head having a discharge surface in which a discharge port is opened, a pressure chamber which communicates with the discharge port, and an actuator which is configured to change a volume of the pressure chamber; a carriage configured to move the head in a scanning direction; a conveyor configured to move an object in a conveyance direction crossing the scanning direction; a posture changing mechanism configured to change a facing posture of the head with respect to the object; and a controller configured to control the actuator, the carriage, the conveyor and the posture changing mechanism, based on image data, to execute alternately and repeatedly a scanning operation and a conveying operation.

17 Claims, 5 Drawing Sheets

PRINTING APPARATUS

CROSS REFERENCE TO RELATED APPLICATION

The present application claims priority from Japanese Patent Application No. 2018-247783 filed on Dec. 28, 2018, the disclosure of which is incorporated herein by reference in its entirety.

BACKGROUND

Field of the Invention

The present disclosure relates to a printing apparatus.

Description of the Related Art

Japanese Patent Application Laid-open No. 2011-177931 discloses a three-dimensional printer performing printing on a print object which has a three-dimensional shape. In this three-dimensional printer, a printer head is moved relative to the print object so that a nozzle surface formed with nozzles is parallel to a tangent plane which contacts with printing object at a middle point of a print line on a surface of the printing object, and that the nozzle surface is separated away from the middle point of the print line at a predetermined spacing distance.

SUMMARY

In the above-described three-dimensional printer, an operation of moving the nozzle surface in a scanning direction, and an operation of moving the nozzle surface in a conveyance direction crossing the scanning direction are repeated to thereby perform printing on a surface of the print object. On the print line, in a case that the tangent plane at the middle point and the tangent plane at a point different from the middle point are not parallel to each other, the density of a print image at the point different from the middle point is lower than the density of the print image at the middle point. Further, in a case that the nozzle surface is moved in the conveyance direction, the above-described densities are changed in a band-like manner at a joined part at which images are joined to each other, which in turn causes any lowering in the image quality.

The present disclosure has been made to solve the above-described problem; an object of the present disclosure is to provide a printing apparatus wherein any change in the density is hardly conspicuous at a joined part in the conveyance direction at which print images are joined to each other.

According to a first aspect of the present disclosure, there is provided a printing apparatus including: a head having a discharge surface in which a discharge port is opened, a pressure chamber which communicates with the discharge port, and an actuator which is configured to change a volume of the pressure chamber; a carriage configured to move the head in a scanning direction; a conveyor configured to move an object in a conveyance direction crossing the scanning direction; a posture changing mechanism configured to change a facing posture of the head with respect to the object; and a controller, wherein the controller is configured to control the actuator, the carriage, the conveyor and the posture changing mechanism, based on image data, to execute alternately and repeatedly a scanning operation and a conveying operation, the scanning operation being an operation of moving the head relative to the object in the scanning direction and including an image forming operation, the image forming operation being an operation of forming an image on the object by controlling the actuator to discharge liquid inside the pressure chamber from the nozzle, the conveying operation being an operation of moving the object relative to the head in the conveyance direction, wherein the controller is configured to control the posture-changing mechanism to change the facing posture of the head so that a second angle is equal to a first angle, the first angle being formed by the discharge surface and a first part of the object facing the discharge surface in the scanning operation performed last time, the second angle being formed by the discharge surface and a second part of the object facing the discharge surface in the scanning operation to be performed next time, the first part and the second part being adjacent to each other in the conveyance direction.

According to a second aspect of the present disclosure, there is provided a printing apparatus including: a robot arm having a first rotary joint, a second rotary joint different from the first rotary joint, a first link linking the first rotary joint and the second rotary joint to each other, a second link different form the first link and linked to the second rotary joint, a third link fixed to a head configured to discharge liquid droplets, and a third rotary joint linked to the third link; a carriage configured to support the robot arm and to reciprocate in a scanning direction; and a controller, wherein the controller is configured to execute: a first scanning operation of causing the carriage to perform scanning while driving the head to print a first print image on an object; a second scanning operation of causing the carriage to perform the scanning while driving the head to print a second print image which is different from the first print image on the object, and the controller is configured to operate the first rotary joint and the second rotary joint so that a distance between the object and the head in the second scanning operation is equal to a distance between the object and the head in the first scanning operation, and is configured to operate the third rotary joint to change a posture of the head from a first posture to a second posture which is different from the first posture.

According to a third aspect of the present disclosure, there is provided a printing apparatus including: a robot arm having a first rotary joint, a second rotary joint different from the first rotary joint, a first link linking the first rotary joint and the second rotary joint to each other, a second link different from the first link and linked to the second rotary joint, a third link fixed to a head configured to discharge liquid droplets, and a third rotary joint linked to the third link; a conveyor configured to convey an object in a conveyance direction; and a controller, wherein the controller is configured to execute: a first conveying operation of causing the conveyor to convey the object to print a first print image on the object by the head; and a second conveying operation of causing the conveyor to convey the object to print a second print image, which is different from the first print image, on the object by the head, and after the second conveying operation, the controller is configured to operate the first rotary joint and the second rotary joint so that a distance between the object and the head is same before and after the second conveying operation, and is configured to operate the third rotary joint to change a posture of the head from a first posture to a second posture different from the first posture.

In these aspects, a part, of a print image formed by the scanning performed last time, which is located on the side of the next-time scanning position and a part, of a print image to be formed by the scanning performed next time, which is located on the side of the last-time scanning position are adjacent to each other in the conveyance direction, and construct the joined part in (between) the print images. According to these aspects, the print density in the joined part has little difference between the part formed by the scanning performed last time and the part formed by the scanning performed next time. Accordingly, it is possible to make any change in the density to be hardly conspicuous at the joined part.

The present disclosure is capable of providing a printing apparatus which has the configuration as explained above and which is capable of making any change in the density to be hardly conspicuous at the joined part between printing images in the conveyance direction.

The above-described object, another object, and the characteristic and advantage of the present disclosure will become apparent by a detailed explanation of an embodiment of the present disclosure with reference to the drawings attached hereto, as follows.

DESCRIPTION OF THE EMBODIMENTS

[First Embodiment] <Configuration of Printing Apparatus>

Figure 1:
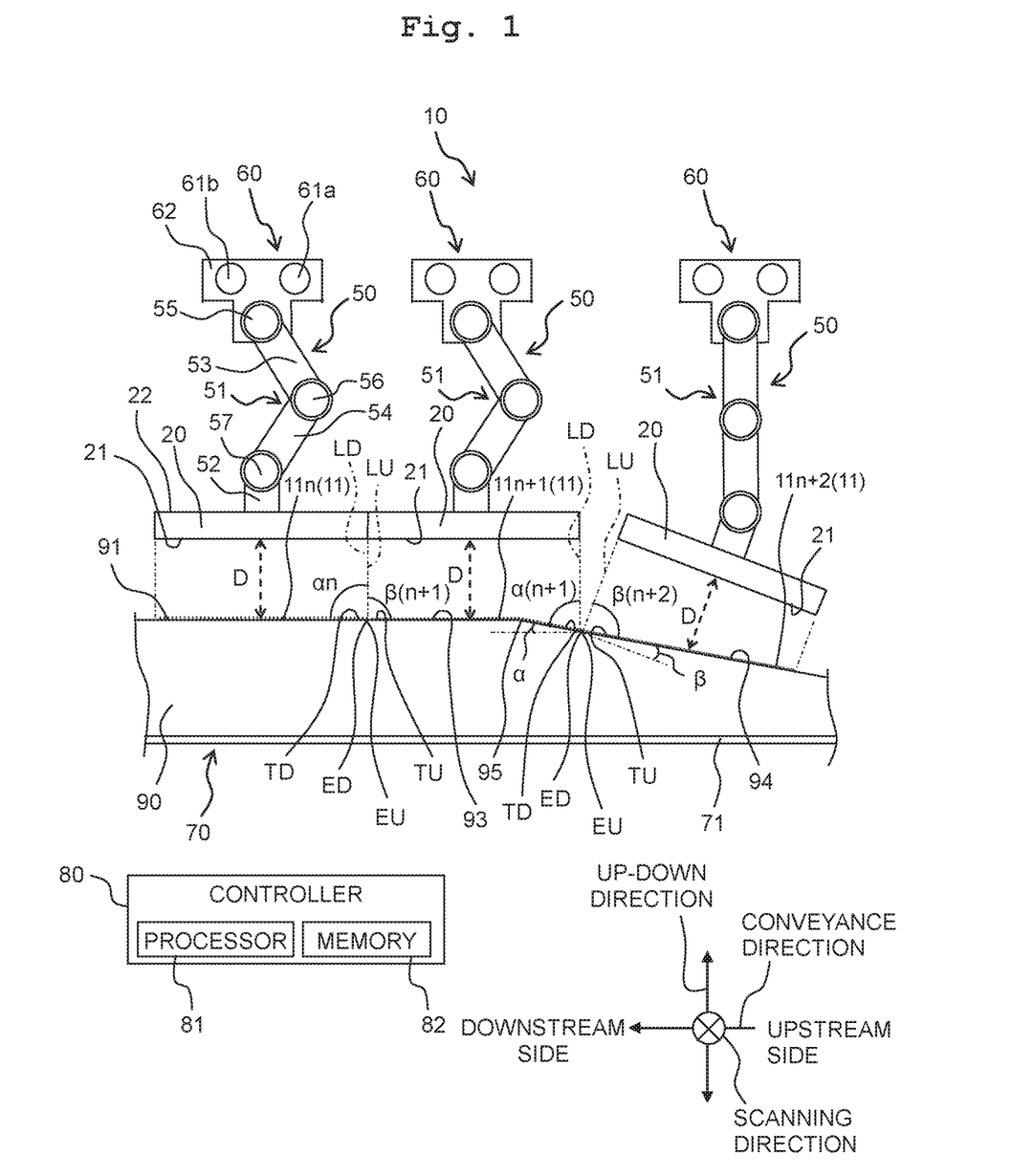
FIG. 1 is a view depicting a printing apparatus according to a first embodiment of the present disclosure, as seen from one side in a scanning direction.
Figure 2:
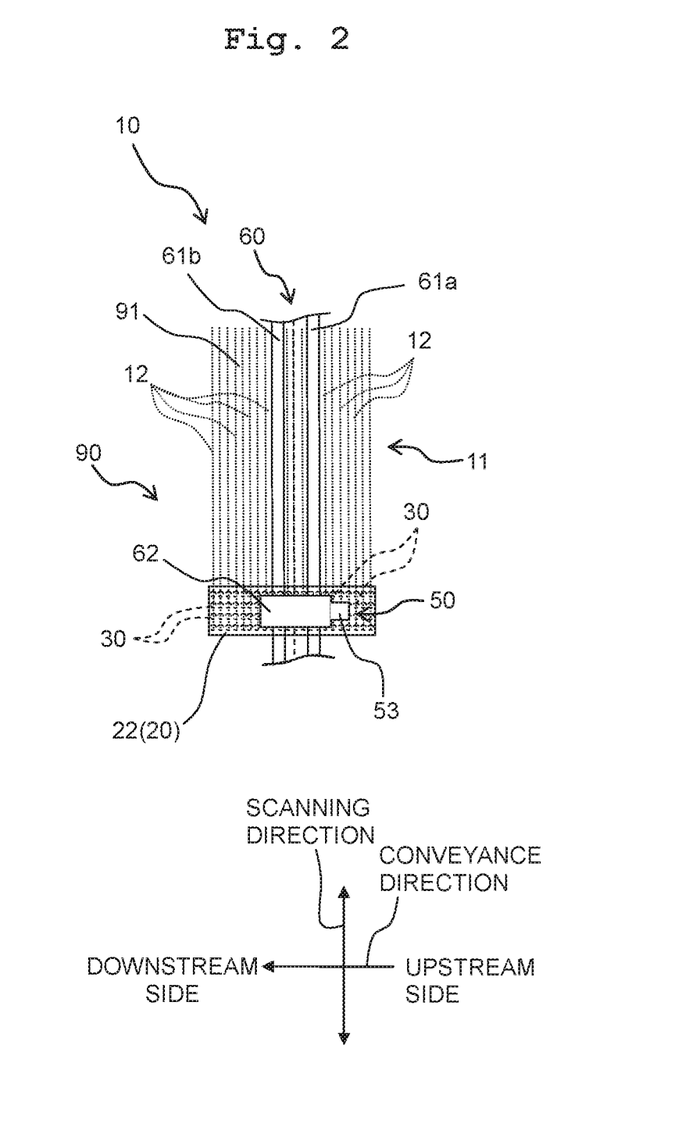
FIG. 2 is a view of a head depicted in FIG. 1, as seen from a side opposite to the side of a discharge surface.

A printing apparatus 10 according to a first embodiment of the present disclosure is an apparatus configured to perform printing on an object 90, as depicted in FIGS. 1 and 2, and is provided with a head 20, a posture changing part 50, a scanning part 60, a conveying part 70 and a controller 80. Note that FIG. 1 depicts a time-dependent change in the positional relationship between the object 90 and the head 20. In the present embodiment, the object 90 is conveyed in a conveyance direction, whereas the head 20 is not moved in the conveyance direction.

The head 20 has, for example, a shape of cuboid or rectangular parallelepiped, and has a discharge surface 21. A channel (flow channel) for a liquid is formed in the inside of the cuboid, and a plurality of discharge ports 30 are opened in the discharge surface 21 which is a plane (flat surface). The details of the head 20 will be described later on.

The posture changing part 50 is, for example, a robot arm, and is basically constructed of a link mechanism. The link mechanism includes three links (first link 53, second link 54 and third link 52) and three rotary joints (first rotary joint 55, second rotary joint 56 and third rotary joint 57).

The three rotary joints have rotary axes which are parallel to one another; each of the three rotary joints is provided, for example, with a driving motor such as a servo motor, and a detector such as an encoders detecting the angle of rotation (rotation angle) of the driving motor.

The first link 53 links the first rotary joint 55 and the second rotary joint 56 to each other, the second link 54 links the second rotary joint 56 and the third rotary joint 57 to each other. A base end of the third link 52 is linked to the third rotary joint 57. Here, the first rotary joint 55 is fixed to a carriage 62 (to be described later on) of the scanning part 60. Namely, the carriage 62 supports the posture-changing part 50 (robot arm). The first link 53 and the second link 54 construct, while also including the second rotary joint 56 which is common to the first link 53 and the second link 54, an expandable-contractable part 51. Further, a forward end of the third link 52 is fixed to an attachment surface (a surface on a side opposite to the discharge surface 21) of the head 20.

Note that it is allowable that the posture changing part 50 does not have the expandable-contractable part 51. Further, the expandable-contractable part 51 is not limited to or restricted by the link mechanism; for example, the expandable-contractable part 51 may be a mechanism having a cylinder and a piston.

The detector of each of the rotary joints outputs a detection signal to the controller 80. The controller 80 receives the detection signals, and obtains a position and an angle of the discharge surface 21 with respect to the scanning part 60. Further, the controller 80 controls the driving motor of each of the rotary joints based on the obtained position and angle, thereby adjusting the position and angle of the discharge surface 21 with respect to the scanning part 60.

The scanning part 60 moves the object 90 and the head 20 relative to each other in the scanning direction. The scanning part 60 has, for example, a carriage 62 and a driving mechanism. The driving mechanism includes a guide rail 61a, a screw shaft 61a, a driving motor, an encoder (detector), etc. The guide rail 61a penetrates through a hole of the carriage 62, and the screw shaft 61b is screwed into a female screw part of the carriage 62. The driving motor is connected to the screw shaft 61a. The rotatory force of the driving motor is transmitted to the screw shaft 61b, and is converted to a linear motion of the carriage 62. The carriage 62 is allowed to reciprocate in the scanning direction by the driving mechanism.

In this situation, the encoder of each of the respective rotary joints detects the rotation angle of the driving motor, and outputs a detection signal to the controller 80. In a case that the controller 80 receives the detection signals, the controller 80 obtains the position in the scanning direction of the carriage 62. Further, based on the obtained position, the controller 80 controls the driving motor of the screw shaft 61b to thereby adjust the position in the scanning direction of the discharge surface 21. Furthermore, in the case that the controller 80 receives the detection signals, the controller 80 generates a driving timing signal for the head 20.

The conveying part 70 moves the object 90 and the head 20 relative to each other in the conveyance direction. The conveying part 70 has, for example, a conveying belt 21, a driving motor and an encoder (detector). Here, the conveying belt 71 includes a pair of rollers and an endless belt. The driving motor is connected to one roller of the pair of rollers. The rotatory force of the driving motor is transmitted to this roller, and is converted to the rotary travelling of the belt. The object 90 is placed on an upper half part of the belt, and is moved in the conveyance direction.

Note that the conveying part 70 is not limited to the above-described configuration. For example, in a case that the object 90 has a shape of a columnar body, it is allowable that the object 90 is axially supported in the scanning direction by a supporting member (corresponding to the above-described roller) so that the object 90 is moved in the scanning direction while being rotated.

In this situation, the encoder of the conveying part 70 detects the rotation angle of the driving motor, and outputs a detection signal to the controller 80. In a case that the controller 80 receives the detection signal, the controller 80 obtains a moving amount in the conveyance direction of the object 90. Further, based on the obtained moving amount, the controller 80 controls the driving motor to thereby adjust the position in the conveying direction of the object 90.

The controller 80 has a processor 81 such as a CPU, etc.; and a memory 82 such as a ROM, RAM, etc. The memory 82 stores therein a basic program and information such as variety of kinds of fixed data, etc. The memory 82 also stores temporarily therein a result of calculation performed by the processor 81, image data from outside, etc. The processor 81 executes a variety of kinds of processing based on the basic program, etc., and controls the head 20, the scanning part 60, the conveying part 70, the posture changing part 50, etc. Note that the controller 80 may be configured of a single controller which performs a centralized control, or may be configured of a plurality of controllers which perform decentralized control in a mutually cooperating manner.

<Configuration of Head>

Figure 3:
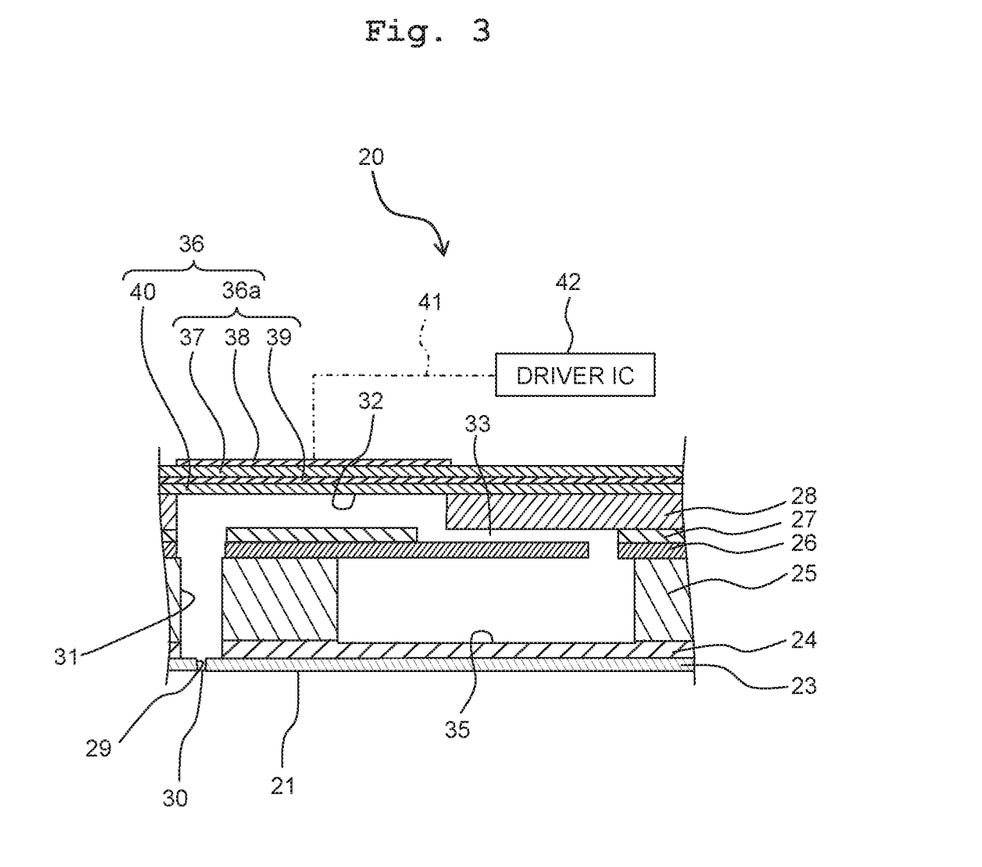
FIG. 3 is a cross-sectional view of the head depicted in FIG. 1.

The head 20 is configured to jet (discharge) a droplet of a liquid (liquid droplet) onto the object 90. As depicted in FIG. 3, the head 20 has a channel forming body and an actuator 36. Among the channel forming body and the actuator 36, the channel forming body is a stacked body of a plurality of plates. The plurality of plates include a nozzle plate 23, a first channel plate 24, a second channel plate 25, a third channel plate 26, a fourth channel plate 27 and a fifth channel plate 28, and are stacked in this order. Each of the plates is formed with holes and grooves of which sizes are various. The respective plates are stacked so that the holes and grooves are combined, thereby forming a plurality of channels in the inside of the stacked body.

Among the plurality of plates, the nozzle plate 23 is formed with a plurality of nozzles 29 penetrating therethrough in a thickness direction of the nozzle plate 23. Liquid droplets are discharged from the discharge surface 21. In the discharge surface 21, as depicted in FIG. 2, the plurality of discharge ports 30 (openings of the nozzles 29) are aligned in the conveyance direction to thereby construct a nozzle row (nozzle array); four nozzle rows are arranged side by side in the scanning direction. The nozzle rows correspond to liquids of mutually different colors (for example, black, yellow, cyan and magenta), respectively.

The channel inside the channel forming body includes a manifold 35 and a plurality of individual channels. Each of the plurality of individual channels spans from an outlet port of the manifold 35 and arrives at one of the discharge ports 30; one piece of throttle channels 33, one piece of pressure chambers 32 and one piece of communicating channels 31 are arranged sequentially in this order between the outlet port of the manifold 35 and one of the discharge ports 30.

Further, the manifold 35 extends in the conveyance direction and is connected to an external tank. A liquid in the tank is firstly supplied to the manifold 35. The liquid in the manifold 35 flows into each of the throttle channels 33, and further reaches one of the nozzles 29 via one of the pressure chambers 32 and one of the communicating channels 31. In a case that the actuator 36 is driven, a liquid droplet is discharged from each of the discharge ports 30.

Note that each of the pressure chambers 32 is formed to penetrate through the fifth channel plate 28. The actuator 36 seals an opening of each of the pressure chambers 32 and is fixed to the channel forming body. The actuator 36 is constructed of piezoelectric elements 36a and a vibration plate 40. Each of the piezoelectric elements 36a includes a common electrode 39, a piezoelectric layer 37 and an individual electrode 38 which are arranged on the vibration plate 40 in this order. On the other hand, the vibration plate 40 is arranged on the fifth channel plate 28 and covers the opening of each of the pressure chambers 32.

The individual electrode 38 is provided on each of the pressure chambers 32. The common electrode 39 covers the entire surface of the vibration plate 40. In this situation, one piece of the piezoelectric elements 36a is constructed of one piece of the individual electrode 38, the common electrode 39, and a partial piezoelectric layer sandwiched between these two electrodes. The actuator 36 is driven to be deformed, thereby changing the volume of each of the pressure chambers 32. In this situation, a liquid droplet is discharged from the discharge port 30.

The individual electrode 38 is connected to a driver IC 42 by a wiring 41. The common electrode 39 is maintained always at the ground potential. The driver IC 42 generates a driving signal for driving each of the piezoelectric elements 36a in accordance with a control signal from the controller 80, and applies the driving signal between the individual electrode 38 and the common electrode 39. In response to the driving signal, the actuator 36 repeats deformation and relaxation.

For example, in a pull-striking discharge system, the actuator 36 is deformed in advance, and the volume of the pressure chamber 32 is reduced. In a case that the driving signal is applied, the actuator 36 is released from the deformed state, thereby enlarging the volume of the pressure chamber 32. After a predetermined time elapses, the actuator 36 is deformed again, thereby reducing the volume of the pressure chamber 32. With this, the pressure is applied to the liquid to thereby discharge a liquid droplet.

<Method of Forming Print image>

A print image 11 on the object 90 is formed by an image forming operation and a scanning operation (image forming and scanning operations), and a conveying operation which are alternately repeated by the printing apparatus 10, as depicted in FIGS. 1 and 2. Here, a first image forming operation and a second image forming operation are included in the image forming operation; a first scanning operation and a second scanning operation are included in the scanning operation; and a first conveying operation and a second conveying operation are included in the conveying operation.

The image forming operation and the scanning operation are continuous operations. As described above, in a case that an image is formed, a liquid droplet is discharged at a predetermined timing. This timing is determined by a position in the scanning direction of the carriage 62. With this, in a case that the head 20 is moved in the scanning direction, liquid droplets are discharged from the respective discharge ports 30 in response to the positions, respectively, of the head 20. An image area having a band-like shape is thereby formed in the scanning direction on the object 90. Namely, before the first image forming operation and the first scanning operation, the first conveying operation is performed. After the first conveying operation, the first image forming operation and the first scanning operation are performed. Then, after the first image forming operation and the first scanning operation, the second conveying operation is further performed. After the second conveying operation, the second image forming operation and the second scanning operation are performed.

In the image forming operation, the controller 80 drives the actuator 36 based on image data. In this situation, a liquid droplet is discharged in an amount instructed by the image data. This discharging of the liquid droplet is performed at a predetermined timing. The timing is designated during the scanning of the carriage 62. In the scanning operation, the controller 80 controls the driving motor of the screw shaft 61b to thereby move the carriage 62 in the scanning direction. At the same time, the controller 80 generates a driving timing signal based on the output (output signal) from the encoder.

Namely, in a case that the carriage 62 is moved, the driving timing signal is generated, and the liquid droplet is discharged in accordance with the driving timing signal. In a case that the carriage 62 is moved in the scanning direction, a partial image having a band-like shape (print image 11) is thus formed at a desired resolution.

In the conveying operation, the object 90 is moved in the conveyance direction relative to the head 20. The controller 80 controls the driving motor of the roller to thereby run the conveying belt 71 in the conveyance direction. The moving amount in this situation corresponds to the width in the conveyance direction of the print image 11. The controller 80 defines this moving amount based on the output (output signal) from the encoder.

One image (a synthetized image in which a plurality of print images 11 are joined in the conveyance direction) is formed on the object 90 by the image forming and scanning operations and the conveying operation alternately performed by the controller 80.

<Method of Changing Facing Posture of Head>

The controller 80 adjusts the posture of the head 20 based on a positional relationship between the discharge surface 21 and a facing surface 91. For example, in a case of forming two print images 11 adjacent to each other, the controller 80 imparts the symmetry to the positional relationship, on the both sides, with a joined part at which the two print images are joined to each other, sandwiched therebetween.

Here, in the vicinity of the joined part of the two print images 11, provided that among angles defined or formed between the facing surface 91 and the discharge surface 21, an angle formed during the scanning operation performed last time is defined as a last-time angle $\alpha$; and an angle formed during the scanning operation to be performed next time is defined as a next-time angle $\beta$. In other words, the last-time angle $\alpha$ is an angle formed in the scanning operation performed last time by the discharge surface 21 and a part, which is included in the facing surface 91 and which is located on a side of a next-time scanning position (next-time position). The next-time angle $\beta$ is an angle formed in the scanning operation to be performed next time by the discharge surface 21 and a part, which is included in the facing surface 91 and which is located on a side of a last-time scanning position (last-time position).

Further, in a n-th (n is a natural number) scanning operation, an angle formed by a perpendicular line LD which is orthogonal to the discharge surface 21 at an end, of the discharge surface 21, on the side of the next-time position and a tangent TD at an end ED, of the facing surface 91, on the side of the next-time position is defined as an angle $\alpha$n. In this case, as indicated by a left-most aspect of arrangement in FIG. 1, the last-time angle $\alpha$ can be expressed as $\alpha=90°-\alpha$n. In other words, the last-time angle $\alpha$ is an angle formed by the discharge surface 21 and a part, of the object 90, facing the discharge surface 21 in the first scanning operation (more specifically, a part, of the object 90, corresponding to a part, of a print image (11n (11)), closer to a joined part of the print image (11n (11)) and a print image (11n+1 (11)) than an end far from the print image (11n+1 (11)). Further, the last-time angle $\alpha$ is an angle formed by the discharge surface 21 and a part, of the object 90, facing the discharge surface 21 after the first conveying operation and before the second conveying operation (more specifically, a part, of the object 90, corresponding to a part, of the print image (11n (11)), closer to the joined part of the print image (11n (11)) and the print image (11n+1 (11)) than an end far from the image (11n+1 (11)).

Note that in the left-most positional relationship of FIG. 1, the perpendicular line LD and the tangent TD are orthogonal to each other, and $\alpha$n=90° is provided.

In a (n+1)th scanning operation, an angle formed by a perpendicular line LU which is orthogonal to the discharge surface 21 at an end, of the discharge surface 21, on the side of the last-time position and a tangent TU at an end EU, of the facing surface 91, on the side of the last-time position is defined as an angle $\beta$(n+1). In this case, as indicated by a central arrangement aspect in FIG. 1, the next-time angle $\beta$ can be expressed as $\beta=90°-\beta$(n+1). In other words, the next-time angle $\beta$ is an angle formed by the discharge surface 21 and a part, of the object 90, facing the discharge surface 21 in the second scanning operation (more specifically, a part, of the object 90, corresponding to a part, of the print image (11n+1 (11)), closer to a joined part of the print image (11n+1 (11)) and the print image (11n (11)) than an end far from the image (11n (11)). Further, the next-time angle $\beta$ is an angle formed by the discharge surface 21 and a part, of the object 90, facing the discharge surface 21 after the second conveying operation (more specifically, a part, of the object 90, corresponding to a part, of the print image (11n+1 (11)), closer to the joined part of the print image (11n+1 (11)) and the print image (11n (11)) than an end far from the image (11n (11)).

Note that in the central positional relationship of FIG. 1, the perpendicular line LU and the tangent TU are orthogonal to each other, and $\beta$(n+1)=90° is provided.

Note that in a case of moving to the left-most aspect of arrangement the central aspect of arrangement, whether or not the adjustment of the posture of the head 20 is required is determined based on the shape of the joined part between these aspects of arrangement. In the vicinity of the joined part of this case, a flat surface part 93 spreads (spans) over two print images 11a and 11n+1 while straddling over the joined part. Namely, there is provided: $\alpha$n=90° as described above. Accordingly, the controller 80 moves only the object 90 in the conveyance direction, while maintaining the posture of the head 20. In this situation, a relationship of $\alpha=\beta(=0°)$ is satisfied.

In the central aspect of arrangement, however, the side of the next-time position of the discharge surface 21 faces a curved surface part 94 (in this case, an inclined surface 94 which is inclined with respect to the flat surface part 93). The perpendicular line LD and the tangent TD cross with respect to each other at an angle $\alpha$(n+1) ($\neq$90°). In response to this, in a right-most aspect of arrangement, the controller 80 adjusts the facing posture of the head 20 so that the perpendicular line LU and the tangent TU cross with respect to each other at an angle $\beta$(n+2) ($\neq$90°). In this situation also, there is provided: $\alpha$(n+1)=$\beta$(n+2), namely, the relationship of $\alpha=\beta$ is satisfied.

The characteristic in the present embodiment is that every time the conveying part 70 repeats the conveying operation, the posture changing part 50 changes the facing posture of the head 20 so that the next-time angle β is equal to the last-time angle α. This achieves such an effect that any change in the image density in the vicinity of the joined part, at which the images are joined to each other, is not generated on the both sides with the joined part of the images being sandwiched therebetween.

Note that in the conveyance direction, the perpendicular line LD and the perpendicular line LU are coincident or adjacent to each other, and the end ED on the side of the next-time position and the end EU on the side of the last-time position are coincident or adjacent to each other. Further, in the conveyance direction, the tangent TD extends from the end ED on the side of the next-time position toward an opposite direction to the side of the next-time position, and the tangent TU extends from the end EU on the side of the last-time position toward an opposite direction to the side of the last-time position.

<Operation of Printing Apparatus>

An explanation will be given about an operation of the printing apparatus 10, by suing FIGS. 1 and 2.

The object 90 as an object or target for which the printing is to be performed has a three-dimensional shape such as columnar, conical or pyramidal, cylindrical shape, etc. The surface of the object 90 has at least one of the flat surface part 93 and the curved surface part 94. For example, the flat surface part 93 is a flat surface and spreads (expands) in the conveyance direction and the scanning direction. The curved surface 94 is a curved surface or a bent surface which is curved or bent with respect to the flat surface part 93.

The image data of each of the print images 11 may be corrected in advance based on the shape of the surface (shape data such as coordinate data of the surface, etc.). The data of the shape is obtained by a three-dimensional scanner and a CAD data, etc., and is stored in the memory 82.

At first, the object 90 is placed on the conveying belt 71. In this situation, the surface of the object 90 is supported by a placement surface of the conveying belt 71 in a predetermined positional relationship. Next, the conveying part 70 is driven. The conveying belt 71 is run only by a predetermined distance up to a position, and is stopped at the position; the object 90 is capable facing the discharge surface 21 at this position. Allowing the conveying belt 71 to run only by the predetermined distance from a position at which the object 90 is placed on the conveying belt 71 to a position at which the print image 11n is formed on the object 91 corresponds to the first conveying operation.

Next, the scanning part 60 is driven so as to start the image forming operation and the scanning operation. During the scanning operation, the head 20 is moved in the up-down direction by the expandable-contractable part 51 of the posture changing part 50. The movement of the head 20 is performed based on the shape data, and the discharge surface 21 is always separated away from the object 90 only by a predetermined distance. Specifically, the first rotary joint 55 and the second rotary joint 56 are operated based on the shape data to change the postures of the first link 53 and the second link 54. Here, a predetermined position, such as the middle point, in the discharge surface 21 is made to be a reference point for determining the predetermined distance (spacing distance or interval D).

In the left-most aspect of arrangement in FIG. 1, the discharge surface 21 is arranged parallel to the facing surface 91. The adjustment of the posture of the discharge surface 21 in this aspect is also performed based on the shape data. In this situation, a discharging direction of the liquid droplet is orthogonal to the facing surface 91. The discharge surface 21 is scanned in the scanning direction in this state wherein the discharging direction of the liquid droplet is orthogonal to the facing surface 91, and the print image 11n is formed on the surface of the object 90. The first image forming operation corresponds to the formation of the print image 11n.

In a case that the formation of the print image 11n is ended, the conveying part 70 is driven again, and the processing proceeds to formation of the print image 11n+1. Namely, allowing the object 90 to move, in the conveying direction, from a position at which the print image 11n is formed to a position at which the print image 11n+1 is formed corresponds to the second conveying operation. As depicted in FIG. 1, in the central aspect of arrangement, the flat surface part 93 straddles the joined part at which the print image 11n obtained in the previous scanning is joined to the image 11n+1. Accordingly, in the scanning operation performed this time ((n+1)th time), the facing posture of the head 20 is adjusted so that the next-time angle β is equal to the last-time angle α. Specifically, the third rotary joint 57 is operated to change the posture of the head 20 from the first posture in which the last-time angle is α to the second posture in which the next-time angle is β. Further, the last-time angle α and the next-time angle β are calculated as follows.

Specifically, in the scanning operation performed the last time (nth time), the angle αn is 90°, and the last-time angle α was 0°. Accordingly, in the scanning operation performed this time ((n+1)th time), the orientation of the discharge surface 21 is adjusted so that the next-time angle β is 0°, and that the angle β(n+1) is 90°.

Further, the controller 80 performs the (n+1)th image forming operation and scanning operation. Namely, the (n+1)th image forming operation corresponds to the second image forming operation, and the (n+1)th scanning operation corresponds to the second scanning operation. With this, a print image 11 formed by the current-time scanning (next-time image 11n+1) is formed on the upstream side in the conveyance direction of the print image 11 formed by the last-time scanning (last-time image 11n). The last-time image 11n and the next-time image 11n+1 are adjacent to each other without any break or gap.

Here, as depicted in FIG. 1, in the central aspect of arrangement, the discharge surface 21 faces the flat surface part 93 of the facing surface 91, on the side of the last-time position, and faces the curved surface part 94 of the facing surface 91 on the side of the next-time position. In this situation, the posture of the discharge surface 21 is parallel to the flat surface part 93. The displacement (transition) from the left-most arrangement aspect to the central arrangement aspect is a parallel displacement in a state that the posture of the head 20 is fixed. In the vicinity of the joined part, the flat surface part 93 is continuous, and there is no change in the image density.

On the side of the next-time position, however, the curved surface part 94 is continued from the flat surface part 93. The curved surface part 94 is inclined with respect to the flat surface part 93 in a direction separated away from the discharge surface 21. Due to this, the density on the curved surface part 94 is low as compared with the density on the flat surface part 93.

Accordingly, in a case of forming the print image 11n+2, the controller 80 controls the posture changing part 50 so as to adjust the posture of the head 20. In order to provide the right-most aspect of arrangement depicted in FIG. 1, the controller 80 makes the spacing distance D between the discharge surface 21 and the facing surface 91 to be a predetermined distance. In this situation, the first rotary joint 55 and the second rotary joint 56 are operated to change the postures of the first link 53 and the second link 54, etc., to thereby expand or elongate the expandable-contractable part 51 of the posture changing part 50. Namely, after the second conveying operation, the first rotary joint 55 and the second rotary joint 56 are operated to make the spacing distance D between the object 90 and the head 20 is the predetermined distance. Further, in order that the next-time angle β is equal to the last-time angle α, the head 20 is rotated with the third rotary joint 57 as the axis of rotation.

Specifically, in the last-time ((n+1)th) scanning operation, the angle α(n+1) was 70° and the last-time angle α was 20°. In view of this, in the current-time ((n+2)th) scanning operation, the orientation of the discharge surface 21 is adjusted so that the next-time angle β is 20° and that the angle β(n+2) is 70°.

Then, the controller 80 performs the (n+2)th image forming and scanning operations. By doing so, with respect to the print image 11 formed by the last-time scanning (last-time image 11n+1), the print image 11 formed by the current-time scanning (next-time image 11n+2) is formed on the upstream side in the conveyance direction of the print image 11 formed by the last-time scanning (last-time image 11n+1). The last-time image 11n+1 and the next-time image 11n+2 are adjacent to each other without any break or gap. Further, the density of the next-time image 11n+2 is substantially equal to the density of the last-time image 11n+1. Accordingly, any change in the density is hardly conspicuous in the vicinity of the joined part.

[First Modification]

In the printing apparatus 10, the operation of making the last-time angle α to be equal to the next-time angle β is preferably performed in a case that the last-time angle α is not more than 20°.

For example, in the central aspect of arrangement of the example depicted in FIG. 1, the curved surface part 94 is present in the facing surface 91, and the crossing angle defined by the facing surface 91 and the curved surface part 94 (last-time angle α) is not more than 20°. In such a case, in the print image 11n+1, a rate of change in duty in the conveyance direction is not more than 6%, and color difference ΔE is not more than 5. The change in density is small, and the print density distribution is hardly conspicuous. In a case that the last-time angle α is not more than 20°, the third rotary joint 57 is operated to change the posture of the head 20 from the first posture to the second posture to thereby make the next-time angle β equal to the last-time angle α. Note that the color difference ΔE is measured, with respect to the image printed on a predetermined paper, by using a spectrophotometric density colorimetry meter "X-Rite eXact" manufactured by X-RITE INC., under an environment wherein the room temperature is 25° C. and the humidity is 50%.

In view of the above-described situation, in the right-most aspect of arrangement, it is possible, in the conveyance direction, to make any change in density to be hardly conspicuous also in the vicinity of the joined part between the last-time image 11n+1 and the next-time image 11n+2, by making the next-time angle β to be equal to the last-time angle α.

[Second Modification]

In the printing apparatus 10, in a case that the next-time angle β cannot be made equal to the last-time angle α, it is allowable to adjust the posture of the head 20 so that the difference between the next-time angle β and the last-time angle α is not more than 10 degrees. For example, such a case that the last-time angle α is greater than 20° is defined as the case that the next-time angle β cannot be made equal to the last-time angle α.

For example, in the right-most aspect of arrangement, there is such a case that the discharge surface 21 abut against (makes contact with) the facing surface 91, depending on the shape of the facing surface 91. In such a case, the controller 80 performs the following setting: angle α(n+1)>angle β(n+2)≥angle α(n+1)−10°. In this situation, the next-time angle β is α>β≥α−10°. In other words, the next-time angle β is an angle which is smaller than the last-time angle α and which is not less than an angle smaller than the last-time angle α by 10°.

According to this configuration, the difference between the next-time angle β and the last-time angle α is set to be not more than 10°. With this, the next-time image 11n+2 is made to be adjacent to the last-time image 11n+1 with the color difference ΔE of not more than 2. Between these images, any difference in the density at the joined part can be made small to such an extent that the difference is hard to be visually recognized. It is also possible to make any change in the density to be hardly conspicuous as a whole.

Second Embodiment

Figure 4:
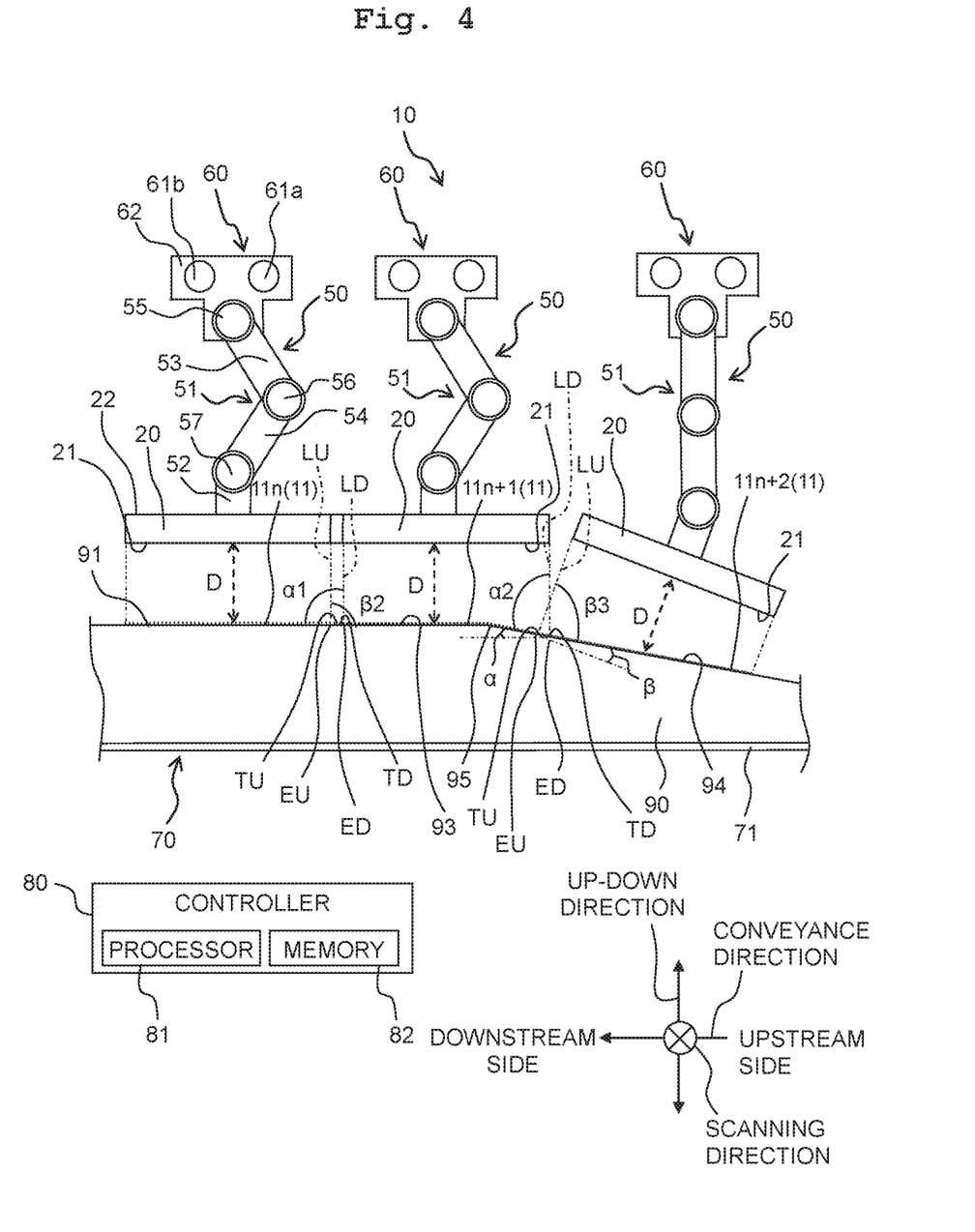
FIG. 4 is a view depicting a printing apparatus according to a second embodiment of the present disclosure, as seen from the one side in the scanning direction.

A printing apparatus 10 according to a second embodiment is different from the first embodiment in the control with respect to the vicinity of the joined part, as depicted in FIG. 4. Since the second embodiment is similar to the above-described first embodiment, except for the control with respect to the vicinity of the joined part, any explanation therefor will be omitted. In the joined part, the controller 80 overlaps a part of a last-time image and a part of a next-time image with each other. Namely, the conveying part 70 conveys the object 90 so that a part of a scanning range in the second scanning operation overlaps with a part of a scanning range in the first scanning operation.

According to this configuration, the controller 80 determines a conveyance amount of the object 90 while considering an overlap amount of the images (last-time image and the next-time image). Since print images 11 which are adjacent to each other (last-time image and next-time image) overlap with each other in the conveyance direction, any change in the density at the joined part can be made hardly conspicuous. This overlap area is constructed of a plurality of print lines 12; at least two mutually different discharge ports 30 are involved in the formation of the respective print lines 12. Even in such a case that there is any error in the installation position of the head 20 in the conveying operation, any uniformity or unevenness in the density at the jointed part is hard to be recognized. This also relaxes the feeding accuracy of the head 20, as well.

Note that also in the printing apparatus 10 according to the second embodiment, the controller 80 can perform the control in a similar manner as in the first and second modifications.

Third Embodiment

Figure 5:
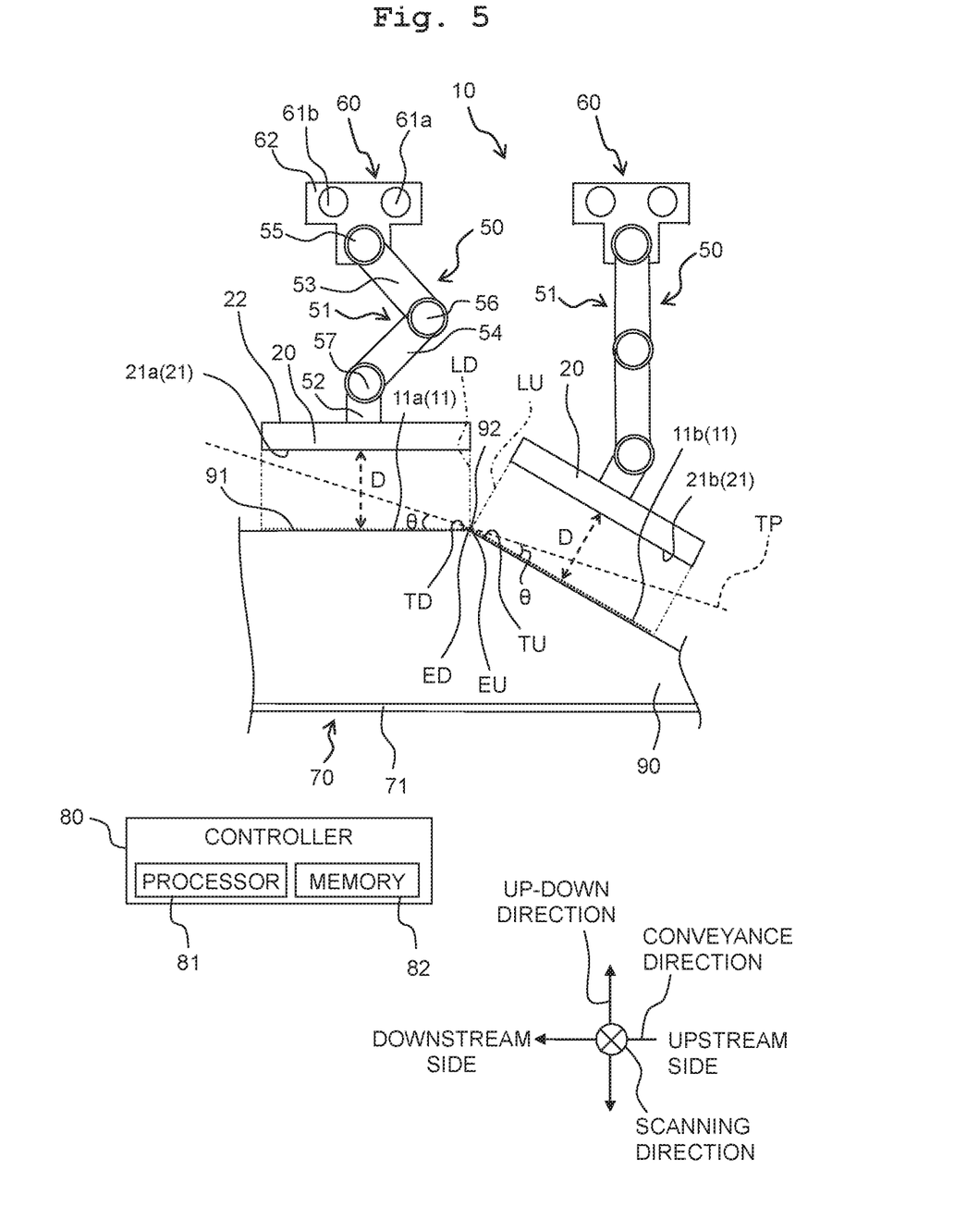
FIG. 5 is a view depicting a printing apparatus according to a third embodiment of the present disclosure, as seen from the one side in the scanning direction.

A printing apparatus 10 according to a third embodiment is different from the first embodiment in the control of the posture of the head 20 in the vicinity of the joined part, as depicted in FIG. 5. Since the third embodiment is similar to the above-described first embodiment, except for the control of the posture of the head 20 in the vicinity of the joined part, any explanation therefor will be omitted.

An object 90 has a curved part 92 in the conveyance direction, and a curving angle is large. Specifically, there is such a case that a tangent plane TP which makes contact with an apex point of the curve part 92 crosses the discharge surface 21 at an angle θ>20°. In this case, the controller 80 adjusts the conveying operation so as to perform a scanning operation sandwiching (spanning over) the curved part 92.

Specifically, the controller 80 causes the position of the joined part to correspond to a contact position of the tangent plane TP. For example, the controller 80 identifies or specifies a position of the apex of the curve part 92 in advance. After doing so, the controller 80 matches a discharge port 30 on a side of a next-time scanning operation to the apex of the curve part 92. In the conveying operation following to this matching, the controller 80 matches a discharge port 30 on a side of a last-time scanning operation to the apex of the curved part 92. In this situation, it is allowable that, as described above, the matching of the discharge port 30 is performed so that a print image 11 formed by the last-time scanning operation and a print image 11 to be formed by the next-time scanning operation are arranged side by side via a gap (spacing distance) corresponding to the resolution disposed therebetween, or that the print images 11 are overlapped with each other at end parts thereof, respectively. Further, it is allowable that, in the first scanning operation, the scanning is performed at least for the flat surface part 93, and the liquid is discharged only from a part, of the discharge surface 21, facing the flat surface part 93; and it is allowable that, in the second scanning operation, the scanning is performed at least for the curved surface part 94, and the liquid is discharged only from a part, of the discharge surface 21, facing the curved surface part 94.

In a case that the discharge surface 21 is positioned as described above, the last-time image 11a and the next-time image 11b sandwich the curve part 92 therebetween in the conveyance direction. Here, also in the two scanning directions sandwiching the curved part 92 therebetween, the relationship of the last-time angle α=the next-time angle β(=0°) holds.

In a case that an angle θ of the curved part 92 is greater than 20°, the color difference ΔE is not less than 5. In a case that the curved part 92 is included in a forming area of the print images 11, the change in the color density in the conveyance direction becomes conspicuous. However, the positional relationship between the scanning operation(s) and the curved part 92 is adjusted and thus the curved part 92 is not included in the image forming area. Therefore, the change in the color density which sandwiches the curved part 92 therebetween is hardly conspicuous.

Note that also in the third embodiment, the controller 80 is capable of performing the control similarly in the first modification, the second modification and the second embodiment.

Other Embodiments

Here, in any of the embodiments, in a case that the object 90 and the head 20 can be move relative to each other in the scanning direction, it is allowable to move the object 90 relative to the head 20, instead of moving the head 20 relative to the object 90, or to move both the head 20 and the object 90 relative to each other. This is similarly applicable also to the movement in the conveyance direction.

In all the above-described embodiments, with respect to the scanning direction, the surface of the object 90 extends linearly. It is allowable, however, the surface of the object 90 is bent or curved with respect to the scanning direction. In such a case, the controller 80 may control the expandable-contractable part 51 of the posture changing part 50 so that the distance between the discharge surface 21 and the facing surface 91 becomes to be a predetermined distance during the scanning operation.

What is claimed is:

1. A printing apparatus comprising:

a head having a discharge surface in which a discharge port is opened, a pressure chamber which communicates with the discharge port, and an actuator which is configured to change a volume of the pressure chamber;

a carriage configured to move the head in a scanning direction;

a conveyor configured to move an object in a conveyance direction crossing the scanning direction;

a posture changing mechanism configured to change a facing posture of the head with respect to the object; and a controller, wherein the controller is configured to control the actuator, the carriage, the conveyor and the posture changing mechanism, based on image data, to execute alternately and repeatedly a scanning operation and a conveying operation, the scanning operation being an operation of moving the head relative to the object in the scanning direction and including an image forming operation, the image forming operation being an operation of forming an image on the object by controlling the actuator to discharge liquid inside the pressure chamber from a nozzle, the conveying operation being an operation of moving the object relative to the head in the conveyance direction, wherein the controller is configured to control the posture changing mechanism to change the facing posture of the head so that a second angle is equal to a first angle, the first angle being formed by the discharge surface and a first part of the object facing the discharge surface in the scanning operation performed last time, the second angle being formed by the discharge surface and a second part of the object facing the discharge surface in the scanning operation to be performed next time, the first part and the second part being adjacent to each other in the conveyance direction, and wherein in a case that the first angle is not more than 20°, the controller is configured to control the posture changing mechanism to change the facing posture of the head so that the second angle is equal to the first angle.

2. The printing apparatus according to claim 1, wherein in a case that it is impossible to change the facing posture of the head so that the second angle is equal to the first angle, the controller is configured to control the posture changing mechanism to change the facing posture of the head so that a difference between the second angle and the first angle is not more than 10°.

3. The printing apparatus according to claim 1, wherein the controller is configured to perform the conveying operation so that a part of the image formed by the image forming operation in the scanning operation which is to be performed next time overlaps the image formed by the image forming operation in the scanning operation performed last time.

4. The printing apparatus according to claim 1,
wherein the object has a curved part,
an angle formed by the discharge surface and a tangent plane of the curved part is not less than 20° as viewed from a direction orthogonal to the conveyance direction, and
the controller is configured to perform the conveying operation so that the image formed on a facing surface of the object by the image forming operation in the scanning operation which is to be performed next time is adjacent, via the curved part, to the image formed on the facing surface by the image forming operation in the scanning operation performed last time.

5. The printing apparatus according to claim 4, wherein the facing surface has at least one of a flat surface part extending in the conveyance direction, and a curved surface part curved in the conveyance direction.

6. A printing apparatus comprising:
a robot arm having a first rotary joint, a second rotary joint different from the first rotary joint, a first link linking the first rotary joint and the second rotary joint to each other, a second link different from the first link and linked to the second rotary joint, a third link fixed to a head configured to discharge liquid droplets, and a third rotary joint linked to the third link;
a carriage configured to support the robot arm and to reciprocate in a scanning direction; and
a controller,
wherein the controller is configured to execute:
a first scanning operation of causing the carriage to perform scanning while driving the head to print a first print image on an object; and
a second scanning operation of causing the carriage to perform the scanning while driving the head to print a second print image which is different from the first print image on the object,
the controller is configured to operate the first rotary joint and the second rotary joint so that a distance between the object and the head in the second scanning operation is equal to a distance between the object and the head in the first scanning operation, and is configured to operate the third rotary joint to change a posture of the head from a first posture to a second posture which is different from the first posture,
wherein the head has an attachment surface to which the third link is attached, and a discharge surface from which the liquid droplets are discharged,
the controller is configured to calculate a first angle formed by the discharge surface and a first part of the object, the first part facing the discharge surface in the first scanning operation, the first part corresponding to a part, of the first print image, which is closer to a joined part of the first print image and the second print image than an end far from the second print image, and
in a case that the first angle is not more than 20°, the controller is configured to operate the third rotary joint to change the posture of the head to the second posture.

7. The printing apparatus according to claim 6,
wherein the controller is configured to calculate a second angle formed by the discharge surface and a second part of the object, the second part facing the discharge surface in the second scanning operation, the second part corresponding to a part, of the second print image, which is closer to the joined part than an end far from the first print image, and
the second posture is a posture of the head in which the first angle is equal to the second angle.

8. The printing apparatus according to claim 6,
wherein the controller is configured to calculate a second angle formed by the discharge surface and a second part of the object, the second part facing the discharge surface in the second scanning operation, the second part corresponding to a part, of the second print image, which is closer to the joined part than an end far from the first print image, and
in a case that the first angle is greater than 20°, the second posture is a posture of the head in which the second angle is smaller than the first angle and the second angle is not less than a third angle which is smaller than the first angle by 10°.

9. The printing apparatus according to claim 6, further comprising a conveyor configured to convey the object in a conveyance direction crossing the scanning direction,
wherein the controller is configured to control the conveyor to convey the object so that a part of a scanning range in the second scanning operation overlaps with a scanning range in the first scanning operation.

10. The printing apparatus according to claim 6,
wherein the object has a first surface and a second surface different from the first surface,
in the first scanning operation, the controller is configured to cause the carriage to perform the scanning of at least the first surface, and to discharge the liquid droplets only from a part, of the discharge surface, facing the first surface, and
in the second scanning operation, the controller is configured to cause the carriage to perform the scanning of at least the second surface, and to discharge the liquid droplets only from a part, of the discharge surface, facing the second surface.

11. The printing apparatus according to claim 6, wherein the first rotary joint is fixed to the carriage.

12. The printing apparatus according to claim 6, wherein the controller is configured to control the robot arm to operate the first rotary joint and the second rotary joint at least in one of the first scanning operation and the second scanning operation.

13. A printing apparatus comprising:
a robot arm having a first rotary joint, a second rotary joint different from the first rotary joint, a first link linking the first rotary joint and the second rotary joint to each other, a second link different from the first link and linked to the second rotary joint, a third link fixed to a head configured to discharge liquid droplets, and a third rotary joint linked to the third link;
a conveyor configured to convey an object in a conveyance direction; and
a controller,
wherein the controller is configured to execute:
a first conveying operation of causing the conveyor to convey the object to print a first print image on the object by the head; and
a second conveying operation of causing the conveyor to convey the object to print a second print image, which is different from the first print image, on the object by the head, and
after the second conveying operation, the controller is configured to operate the first rotary joint and the second rotary joint so that a distance between the object and the head is same before and after the second conveying operation, and is configured to operate the third rotary joint to change a posture of the head from a first posture to a second posture different from the first posture, wherein the head has an attachment surface to which the third link is attached, and a discharge surface from which the liquid droplets are discharged, the controller is configured to calculate a first angle formed by the discharge surface and a first part of the object, the first part facing the discharge surface after the first conveying operation and before the second conveying operation, the first part corresponding to a part, of the first print image, which is closer to a joined part of the first print image and the second print image than an end far from the second print image, and in a case that the first angle is not more than 20°, the controller is configured to operate the third rotary joint to change the posture of the head to the second posture.

14. The printing apparatus according to claim 13,
wherein the controller is configured to calculate a second angle formed by the discharge surface and a second part of the object, the second part facing the discharge surface after the second conveying operation, the second part corresponding to a part, of the second print image, which is closer to the joined part than an end far from the first print image, and the second posture is a posture of the head in which the first angle is equal to the second angle.

15. The printing apparatus according to claim 13,
wherein the controller is configured to calculate a second angle formed by the discharge surface and a second part of the object, the second part facing the discharge surface after the second conveying operation, the second part corresponding to a part, of the second print image, which is closer to the joined part than an end far from the first print image, and in a case that the first angle is greater than 20°, the second posture is a posture of the head in which the second angle is smaller than the first angle and is not less than a third angle which is smaller than the first angle by 10°.

16. The printing apparatus according to claim 13,
wherein the object has a first surface and a second surface different from the first surface, after the first conveying operation and before the second conveying operation, the controller is configured to cause the first surface to face the discharge surface, and to discharge the liquid droplets only from a part, of the discharge surface, facing the first surface, and after the second conveying operation, the controller is configured to cause the second surface to face the discharge surface, and to discharge the liquid droplets only from a part, of the discharge surface, facing the second surface.

17. The printing apparatus according to claim 13, further comprising a carriage configured to support the robot arm and to reciprocate in a scanning direction.

* * * * *